(12) United States Patent
Snyder et al.

(10) Patent No.: US 10,994,486 B2
(45) Date of Patent: May 4, 2021

(54) THERMALLY EFFICIENT TRANSPORT SYSTEM FOR PHASE CHANGE INKS IN A THREE DIMENSIONAL PRINTING SYSTEM

(71) Applicant: 3D Systems, Inc., Rock Hill, SC (US)

(72) Inventors: Keaton Jonathan Daniel Snyder, Donald, OR (US); Michael E. Jones, West Linn, OR (US)

(73) Assignee: 3D Systems, Inc., Rock Hill, SC (US)

( * ) Notice: Subject to any disclaimer, the term of this patent is extended or adjusted under 35 U.S.C. 154(b) by 477 days.

(21) Appl. No.: 15/920,862

(22) Filed: Mar. 14, 2018

(65) Prior Publication Data

US 2018/0264727 A1 Sep. 20, 2018

Related U.S. Application Data

(60) Provisional application No. 62/472,952, filed on Mar. 17, 2017.

(51) Int. Cl.
| | |
|---|---|
| *B29C 64/295* | (2017.01) |
| *B29C 64/321* | (2017.01) |
| *B29C 64/209* | (2017.01) |
| *B29C 64/112* | (2017.01) |
| *B33Y 30/00* | (2015.01) |
| *B33Y 70/00* | (2020.01) |

(Continued)

(52) U.S. Cl.
CPC .......... *B29C 64/295* (2017.08); *B29C 64/112* (2017.08); *B29C 64/209* (2017.08); *B29C 64/314* (2017.08); *B29C 64/321* (2017.08); *B33Y 30/00* (2014.12); *B33Y 40/00* (2014.12); *B33Y 70/00* (2014.12); *B41J 2/175* (2013.01)

(58) Field of Classification Search
CPC ... B29C 64/295; B29C 64/314; B29C 64/321; B29C 64/112; B29C 64/209; B33Y 40/00; B33Y 70/00; B33Y 30/00; B41J 2/175
See application file for complete search history.

(56) References Cited

U.S. PATENT DOCUMENTS

2015/0097308 A1* 4/2015 Batchelder ............ B29C 64/393
264/40.6

FOREIGN PATENT DOCUMENTS

| CN | 202528590 | 11/2012 |
|---|---|---|
| EP | 3052299 | 8/2016 |

OTHER PUBLICATIONS

Weifang Donghang Graphic Technology Inc (CN 202528590)(Google Patents Translation) (Year: 2012).*

(Continued)

*Primary Examiner* — Robert J Grun

(57) ABSTRACT

In an aspect of the disclosure, a three dimensional (3D) printing system includes a printhead and an ink supply subsystem. The printhead is for ejecting drops of phase change ink to define a three dimensional article of manufacture. The ink supply subsystem includes an ink tube, a helical resistor, a return conductor, and an outer tube. The ink tube has an inside surface for contacting and transporting the phase change ink and an outer tubular surface. The resistor is helically wound around the outer tubular surface of the ink tube. The return conductor is helically wound around the resistor and has a resistance that is lower than that of the resistor. The outer tube surrounds and protects the resistor and the return conductor and provides insulation to the heated ink transport component.

10 Claims, 4 Drawing Sheets

(51) Int. Cl.
*B29C 64/314* (2017.01)
*B33Y 40/00* (2020.01)
*B41J 2/175* (2006.01)

(56) References Cited

OTHER PUBLICATIONS

PCT International Search Report the International Searching Authority for PCT/US2018/022349, dated Jul. 13, 2018 (13 pages).
PCT Written Opinion of the International Searching Authority for PCT/US2018/022349, dated Jul. 13, 2018 (6 pages).

\* cited by examiner

THERMALLY EFFICIENT TRANSPORT SYSTEM FOR PHASE CHANGE INKS IN A THREE DIMENSIONAL PRINTING SYSTEM

This non-provisional patent application claims priority to U.S. Provisional Application Ser. No. 62/472,952, Entitled "THERMALLY EFFICIENT TRANSPORT SYSTEM FOR PHASE CHANGE INKS IN A THREE DIMENSIONAL PRINTING SYSTEM" by Keaton Jonathan Daniel Snyder et al., filed on Mar. 17, 2017, incorporated herein by reference under the benefit of U.S.C. 119(e).

FIELD OF THE INVENTION

The present disclosure concerns an apparatus and method for fabrication of solid three dimensional (3D) articles of manufacture from the selective deposition of materials from an inkjet printhead. More particularly, the present disclosure concerns a thermally efficient apparatus for delivering heated phase change inks to the inkjet printhead.

BACKGROUND

Three dimensional (3D) printing systems are in rapidly increasing use for purposes such as prototyping and manufacturing. One type of 3D printer utilizes an inkjet printhead to selectively deposit a material to form a three dimensional (3D) article of manufacture. In some embodiments the 3D printer utilizes phase change inks. However, utilizing phase change inks introduces some challenges.

One challenge is the transport of the phase change inks from an ink supply to the inkjet printhead. For some embodiments the inks must remain in a liquid phase between a fixed ink supply station and a moving printhead. Conduits transporting the ink must be able to flex back and forth as the printhead moves but must also incorporate a means to keep the ink in a liquid state. This presents design challenges for the conduit including thermal efficiency and an ability to withstand the flexural stress.

SUMMARY

Figure 1:
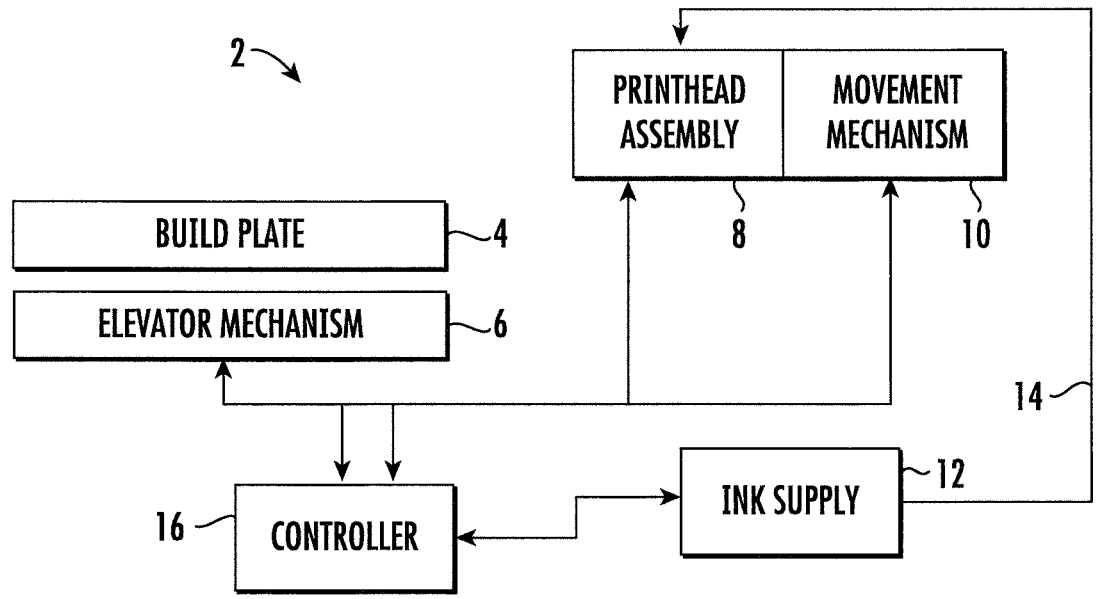
FIG. 1 is a schematic block diagram of an exemplary printing system.

In an aspect of the disclosure, a three dimensional (3D) printing system includes a printhead and an ink supply subsystem. The printhead is for ejecting drops of phase change ink to define a three dimensional article of manufacture. The ink supply subsystem is for providing the phase change ink to the printhead and includes a heated ink transport component. The ink transport component further includes an ink tube, a helical resistor, a return conductor, and an outer tube. The ink tube has an inside surface for contacting and transporting the phase change ink and an outer tubular surface. The resistor is helically wound around the outer tubular surface of the ink tube. The resistor in some embodiments has an elongate rectangular cross sectional form factor, whereas in other embodiments the resistor defines other form factors. The major axis of the elongate rectangular cross section substantially conforms to the outer tubular surface of the ink tube to maximize heat transfer from the resistor to the ink conduit. The return conductor is helically wound around the resistor and has a resistance that is lower than that of the resistor. The outer tube surrounds and protects the resistor and the return conductor and provides insulation to the heated ink transport component.

In one implementation the three dimensional (3D) printing system includes a controller, an elevator mechanism, a movement mechanism, and a sensor. The elevator controls a height of a print surface. The movement mechanism imparts relative motion between the printhead and the print surface. The sensor generates information or a signal based upon a temperature of the phase change ink in the ink tube. The controller includes a processor coupled to an information storage device. The information storage device includes a non-volatile or non-transient storage device storing instructions that, when executed by the processor, receive information or signals from the sensor, control the elevator mechanism, the printhead, the movement mechanism, and other portions of the three dimensional printing system during the formation of a three dimensional article of manufacturing. The controller can be at one location or distributed among a plurality of locations in the three dimensional printing system.

In another implementation the outer tubular surface of the ink tube has an outer conduit diameter, the resistor defines an inside diameter that is greater than the outer conduit diameter.

In yet another implementation the resistor is helically wound with a first pitch, the return conductor is helically wound with a second pitch that is greater than the first pitch.

In yet another implementation the return conductor has a solid circular cross section. A tubular cylindrical insulator coats the return conductor and defines an air space between the resistor and an inside surface of the outer tube, the air space provides an added radial thermal resistance between the resistor and a surrounding atmosphere.

DETAILED DESCRIPTION OF THE PREFERRED EMBODIMENTS

Figure 2:
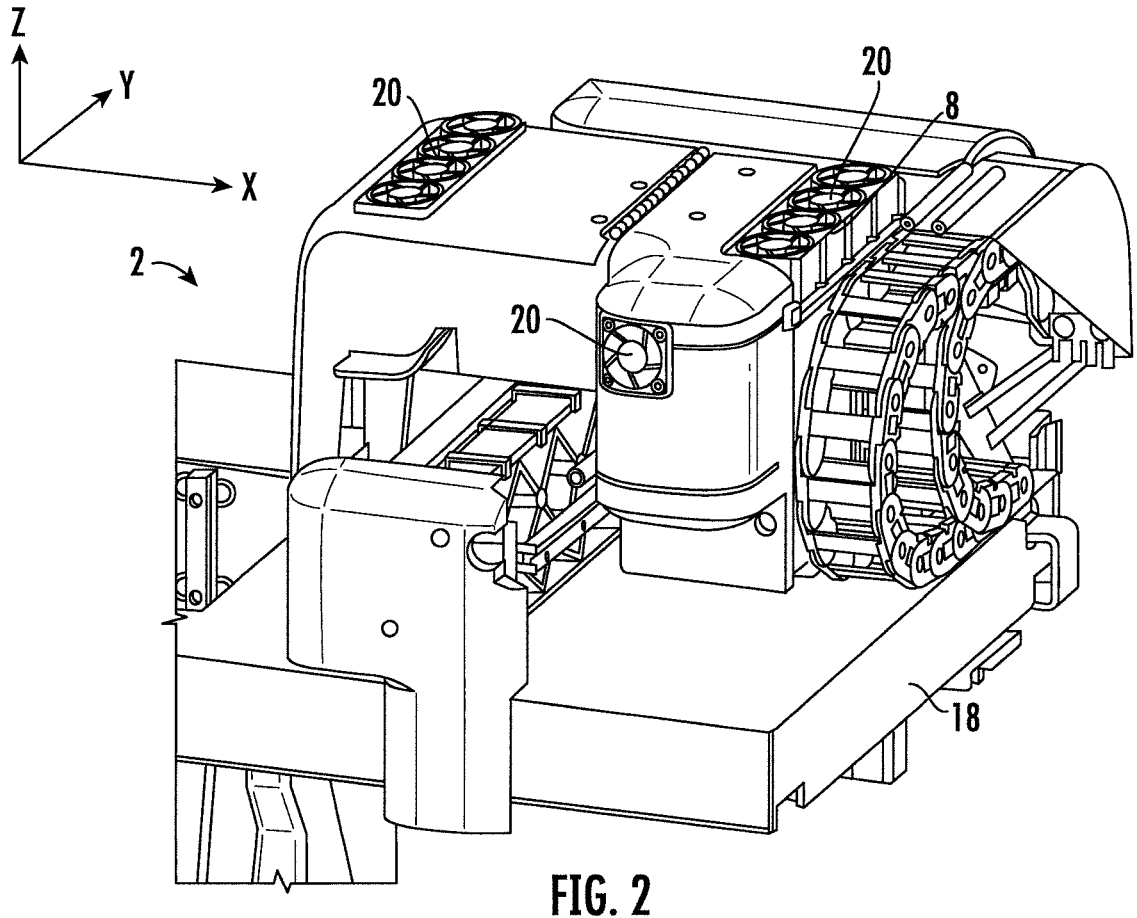
FIG. 2 is an isometric drawing of a portion of an exemplary printing system 2.

FIG. 1 is a schematic block diagram of an exemplary three dimensional printing system 2. FIG. 2 is a isometric drawing of a portion of an exemplary three dimensional printing system 2 that illustrates an exemplary physical arrangement of components. In describing the printing system 2, mutually orthogonal axes X, Y, and Z are utilized. The axes X and Y will be referred to "lateral" or "horizontal" axes and Z will be described as a "vertical" axis. However, it is to be understood that Z is not necessarily perfectly aligned with a gravitational reference. Also X refers to a "scan" axis and Y refers to a "transverse" axis. The direction +Z is referred to as a generally "upward" direction and −Z is a generally "downward" direction.

Printing system 2 includes an elevator mechanism 6 for supporting, aligning, and vertically positioning a build plate 4. The build plate 4 is typically formed from a rigid material such as aluminum and includes an upper surface upon which a three dimensional (3D) article of manufacture is to be formed. The rigidity is important so that accurate positional and dimensional tolerances can be achieved. The elevator mechanism 4 is configured to controllably position the build plate 4 along the vertical axis Z.

Printing system 2 includes a printhead assembly 8 that is supported and laterally translated by a movement mechanism 10. Movement mechanism 10 is configured to translate the printhead assembly 8 along scan axis X as printhead assembly 8 selectively deposits drops of ink onto the build plate 4 to form layers of a three dimensional (3D) article of manufacture. In alternative embodiments, the build plate is mounted to a movement mechanism that laterally translates the build plate, and the printhead assembly is mounted to an elevator mechanism to vertically position the printhead assembly relative to the build plate. Further embodiments of the present invention include alternative mechanisms for moving the printhead assembly relative to the build plate in the X, Y, and Z axes.

The printhead of printhead assembly 8 receives ink from an ink supply 12 via an ink path 14. In an exemplary embodiment the ink path 14 includes a heated tube that transports a phase change ink from ink supply 12 to the printhead. Controller 16 is configured to operate the printing system 2 for printing a three dimensional (3D) article of manufacture. Controller 16 is also configured to control a temperature of the phase change ink within the ink path 14.

The ink path 14 is a thermally heated conduit 14 that can maintain the phase change ink in a liquid state from the ink supply 12 to the printhead. The thermally heated conduit 14 has features that synergistically (1) maximize a number of flexures that the thermally heated conduit 14 can withstand and (2) maximize heating and thermal efficiency of maintaining the phase change inks in the liquid state.

As illustrated in FIG. 2, the printing system 2 includes a chassis 18 which supports various components including the printhead assembly 8. The printhead assembly 8 scans along scan axis X and includes an array of nozzles that are disposed along the transverse axis Y. Printing system 2 includes a number of fans 20 for cooling various components such as the printhead assembly 8. The effect of these fans 20 on the thermally heated conduit 14 increases a requirement for high thermal efficiency and insulation of thermally heated conduit 14.

Figure 3:
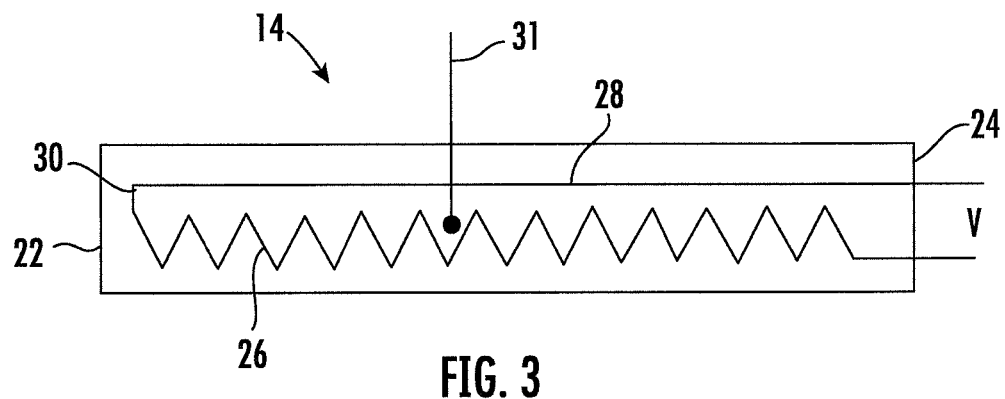
FIG. 3 is a schematic drawing of a thermally heated conduit.

FIG. 3 is a schematic of the thermally heated conduit 14. Conduit 14 includes an inlet 22 for receiving ink from the ink supply 12 and an outlet 24 for delivering ink to the printhead assembly 8. Between inlet 22 and outlet 24 and disposed along a length of conduit 14 is a resistor 26 for heating the ink within the conduit 14. Also between inlet 22 and outlet 24 and disposed along a length of conduit 14 is a return conductor 28. A power supply (not shown) that is part of the control electronics 16 applies a voltage V between input leads to the resistor 26 and return conductor 28. The resistor 26 and return conductor 28 meet at a coupling point 30. According to the illustrative embodiment, the coupling point 30 is proximate to or closest to the inlet 22 and the input leads V meet proximate to or closest to the outlet 24. However, the reverse can also be true—the input leads V can be closest to the inlet 22 and the coupling point 30 can be closest to the outlet 24.

Conduit 14 also includes a temperature sensor 31 that monitors a temperature of the phase change ink in the conduit 14. Temperature sensor 31 can be located at any location along the conduit 14. In one embodiment sensor 31 is located at an intermediate location between the inlet 22 and the outlet 24. In another embodiment sensor 31 is located proximate to the outlet 24. In a further embodiment the sensor 31 is a thermistor. The controller 16 utilizes a signal or information from sensor 31 to monitor a temperature inside conduit 14 and to adjust control signals or current applied to the resistor 26 in response.

Figure 4:
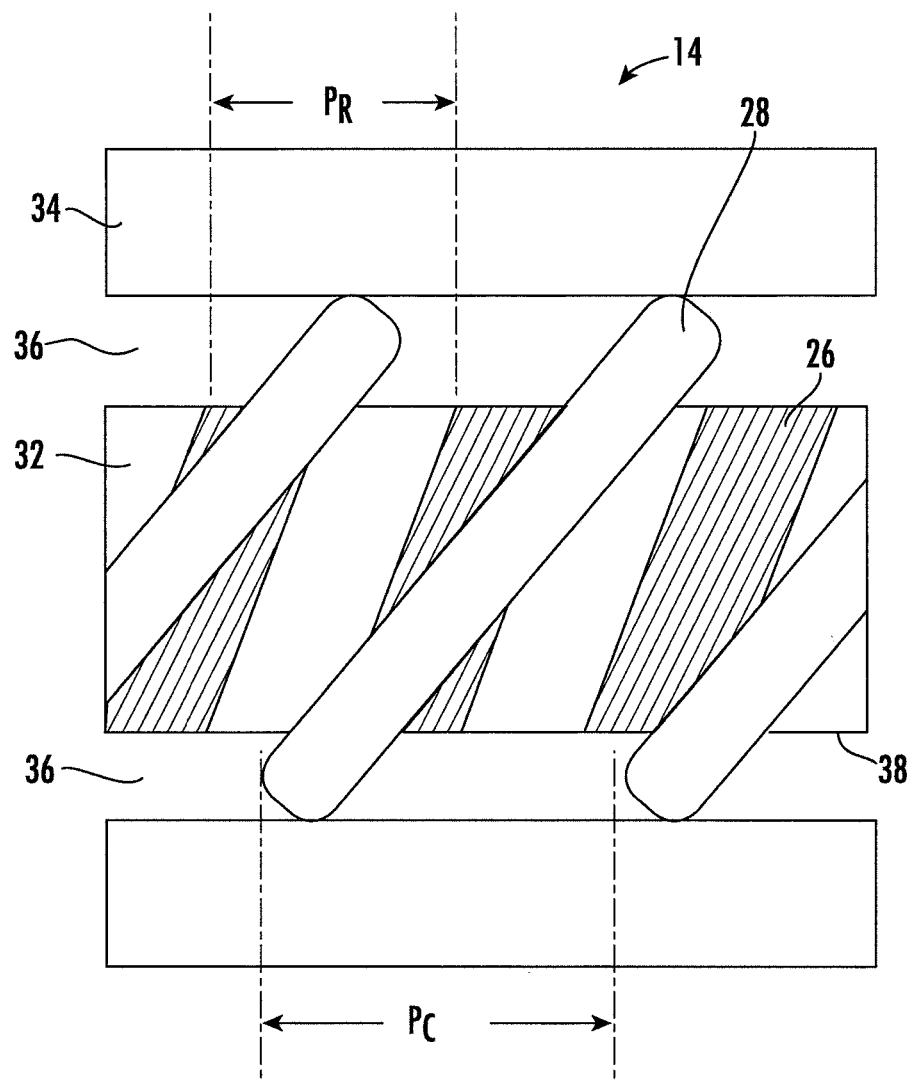
FIG. 4 is a schematic cutaway side view of a portion of a thermally heated conduit.

FIG. 4 is a schematic cutaway side view of a portion of the thermally heated conduit 14. Conduit 14 includes an ink tube 32, helical resistor 26, return conductor 28, and outer tube 34. In one embodiment an air space 36 is defined between the resistor 26 and the outer tube 34. The resistor 26 is helically wound around an outer tubular surface 38 of the ink tube 32 with a resistor pitch $P_R$. The return conductor 28 is helically wound around the resistor 26 with a conductor pitch $P_C$. In a preferred embodiment $P_C > P_R$ to minimize the voltage drop across the return conductor 28 relative to the resistor 26.

Figure 5:
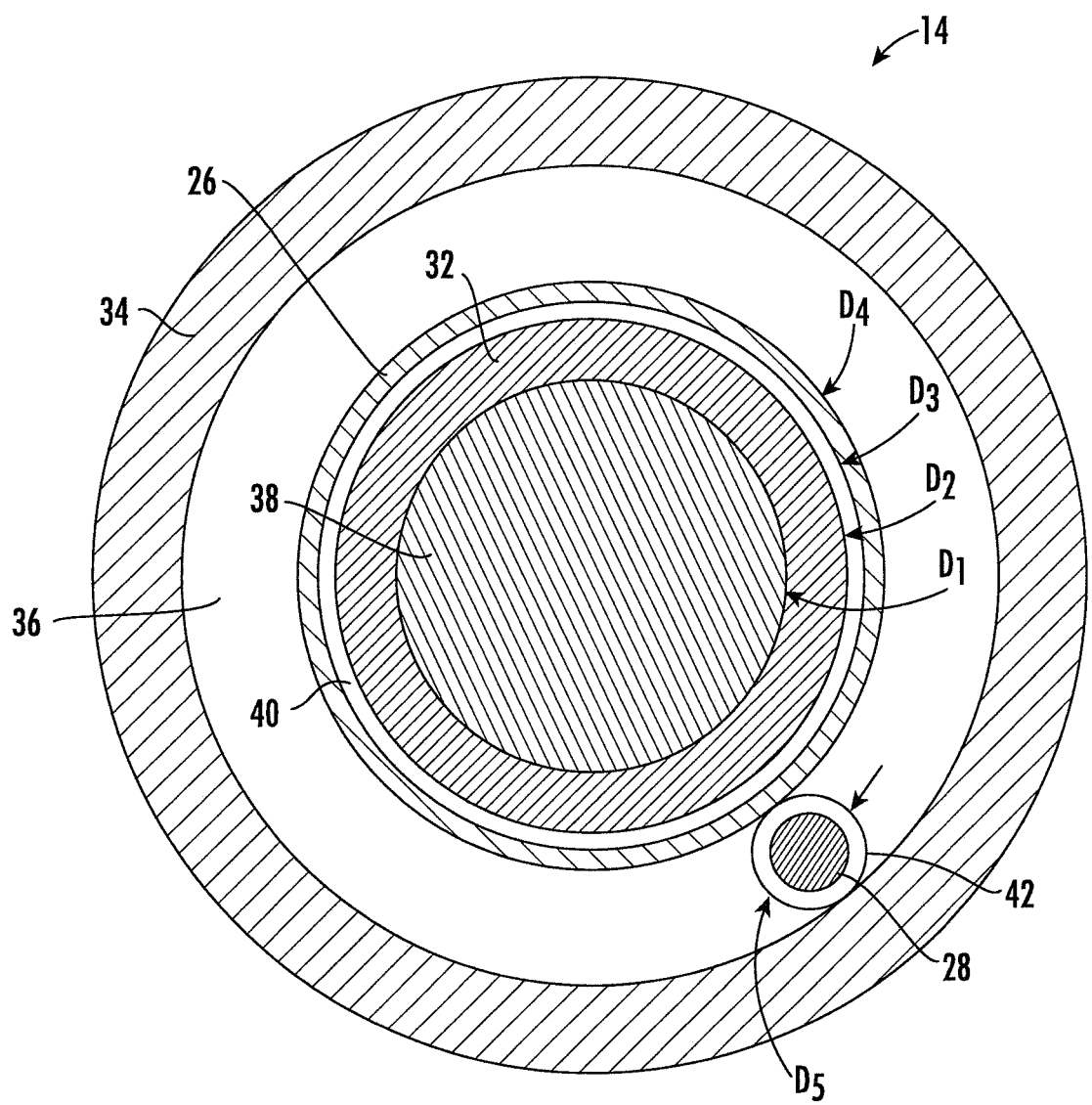
FIG. 5 is a schematic cross section/cutaway end view of a portion of a thermally heated conduit.

FIG. 5 is a schematic cross section/cutaway end view of a portion of the thermally heated conduit 14. Conduit 14 includes ink tube 32 that transports phase change ink 38. Ink tube 32 has inner diameter $D_1$ and an outer diameter $D_2$. In thermal contact with the ink tube 32 is the resistor 26. The resistor 26 is wrapped around the ink tube 32 to initially define a radial space 40 between the ink tube 32 and the resistor 26. The radial space 40 reduces stresses associated with thermal expansion of the ink tube 32. The radial space 40 can be defined by using a fine plastic line or wire to separate the resistor 26 and the ink tube 32 during the winding of the resistor 26 around the ink tube 32. The winding of the resistor defines an inner diameter $D_3$ and an outside diameter $D_4$. The radial space 40 is defined as the distance between $D_3$ and $D_2$, which may change as the relative temperatures of the resistor 26 and ink tube 32 change.

In cross section the resistor 26 has a elongate rectangular cross sectional area in the embodiment of FIG. 5. The elongate rectangular cross section area has a major axis that is aligned with and along the ink tube 32. This maximizes heat transfer between the resistor 26 and the ink tube 32.

The return conductor 28 has a solid circular cross section. A tubular cylindrical insulator 42 surrounds the return conductor 28. The tubular cylindrical insulator defines an outside diameter $D_5$ which can act as a spacer between the resistor 26 and the outer tube 34. In one embodiment the outside diameter $D_5$ can define a radial thickness of the air space 36. The outside diameter $D_5$ can be fine tuned to minimize heat transfer through the air space 36. Thus the return conductor 28 with its tubular cylindrical insulator 42 can provide the dual function of a return electrical path and an insulation optimizer (since the diameter $D_5$ equals the radial air space distance between $D_4$ and an inside surface of the outer tube 34).

Figure 6:
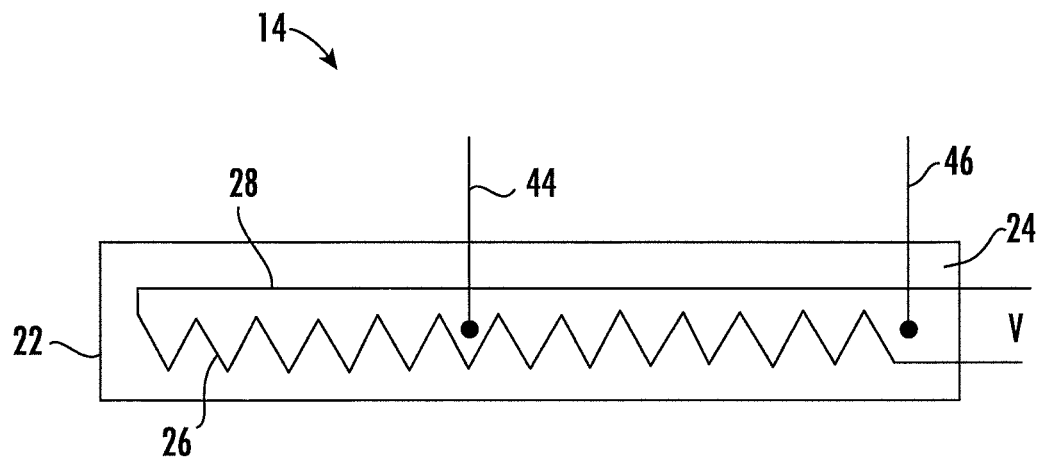
FIG. 6 is a schematic drawing of a first alternative embodiment of a thermally heated conduit.

FIG. 6 depicts a first alternative embodiment of a thermally heated conduit 14. Differences between the embodiment of FIG. 6 and that of FIG. 3 will now be discussed. Conduit 14 includes temperature sensors 44 and 46. Temperature sensor 44 is located at an intermediate point between the inlet 22 and outlet 24 of the thermally heated conduit 14. Temperature sensor 46 is located proximate to the outlet of 24 of the thermally heated conduit 14. In one embodiment the controller 16 receives a signal from the two temperature sensors 44 and 46. The controller can then regulate the temperature to assure the lowest temperature from the two sensors remains above an acceptable threshold.

Figure 7:
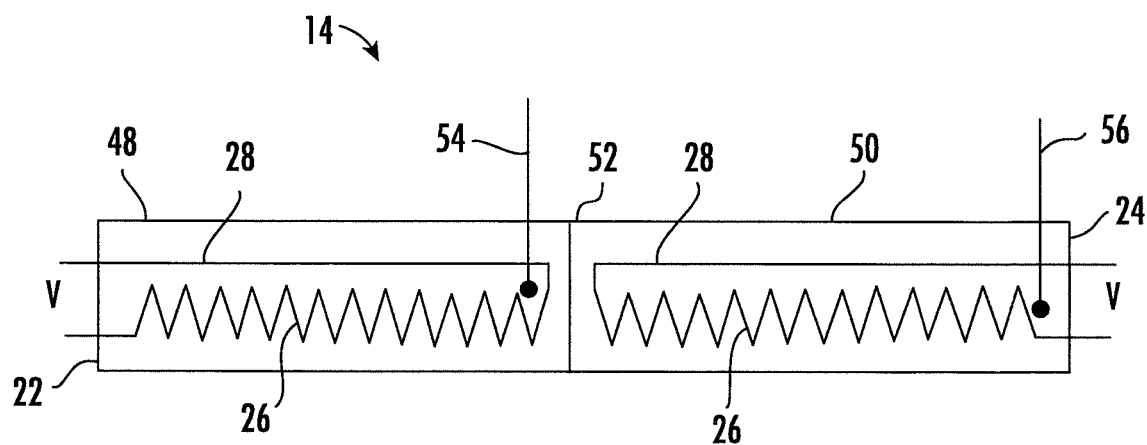
FIG. 7 is a schematic drawing of a second alternative embodiment of a thermally heated conduit.

FIG. 7 depicts a second alternative embodiment of a thermally heated conduit 14 which now includes two conduit zones including a first conduit zone 48 and a second conduit conduit zone 50. The first conduit zone 48 extends from inlet 22 to an intermediate location 52 of the thermally heated conduit 14. The second conduit zone 50 extends from the intermediate location 52 of the thermally heated conduit 14 to the outlet 24. Phase change ink can flow into the inlet 22, through the first conduit zone 48, through the second conduit zone 50, and out of the outlet 24.

The temperature of the first 48 and second 50 conduit zones can be independently controlled in order to provide a more uniform or desired temperature distribution within the thermally heated conduit 14. Further embodiments of the present invention include a plurality of conduit zones. Yet further embodiments of the present invention can include three or more conduit zones. The plurality of conduit zones may be independently controlled using closed loop control systems. The first conduit zone 48 has an independently controlled resistor 26. The first conduit zone also includes a temperature sensor 54. The second conduit 50 also has an independently controlled resistor 26 and a temperature sensor 56. The controller can therefore utilize inputs from temperature sensors 54 and 56 to optimize a power level to be delivered to the zones 48 and 50 respectively.

The resistors 26 and return conductors 28 referred to in FIGS. 6 and 7 can be the same as those described with respect to FIGS. 4 and 5. Other aspects of the thermally heated conduit 14 can also be similar.

The specific embodiments and applications thereof described above are for illustrative purposes only and do not preclude modifications and variations encompassed by the scope of the following claims.

What we claim is:

1. A three dimensional (3D) printing system comprising: a printhead configured to eject drops of phase change ink to define a three dimensional article of manufacture; an ink supply subsystem configured to provide the phase change ink to the printhead which includes a heated ink transport component further comprising: an ink tube having an inside surface for contacting and transporting the phase change ink and an outer tubular surface; a resistor that is helically wound around the outer tubular surface of the ink tube whereby the major axis of the cross section substantially conforms to the outer tubular surface, the resistor having a heater resistance; a return conductor that is helically wound around the resistor and having a resistance that is lower than the resistor; and an outer tube that surrounds and protects the resistor and the return conductor and provides insulation to the heated ink transport component.

2. The three dimensional (3D) printing system of claim 1 wherein the outer tubular surface of the ink tube has an outer conduit diameter, the resistor defines an inside diameter that is greater than the outer conduit diameter.

3. The three dimensional (3D) printing system of claim 1 wherein the resistor is helically wound with a first pitch, the return conductor is helically wound with a second pitch that is greater than the first pitch.

4. The three dimensional (3D) printing system of claim 1 wherein the return conductor has a solid circular cross section.

5. The three dimensional (3D) printing system of claim 4 further comprising a tubular cylindrical insulator that coats the return conductor.

6. The three dimensional (3D) printing system of claim 5 wherein the tubular cylindrical insulator defines an air space between the resistor and an inside surface of the outer tube, the air space provides an added layer thermal radial thermal resistance between the resistor and a surrounding atmosphere.

7. The three dimensional (3D) printing system of claim 1 wherein the resistor defines an elongate rectangular cross sectional form factor.

8. The three dimensional (3D) printing system of claim 1 wherein the ink tube defines a plurality of conduit zones for which the temperatures are independently controlled.

9. The three dimensional (3D) printing system of claim 8 wherein the plurality of conduit zones are independently controlled using closed loop control systems.

10. The three dimensional (3D) printing system of claim 8 wherein the resistor of at least one conduit zone extends from an inlet of the ink tube and the resistor of at least one other conduit zone extends from an outlet of the ink tube.

\* \* \* \* \*